No. 717,237. Patented Dec. 30, 1902.
J. F. MARSTERS.
FISHING FLOAT.
(Application filed Aug. 25, 1902.)
(No Model.)
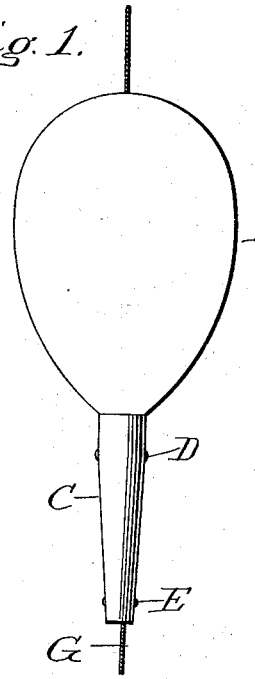
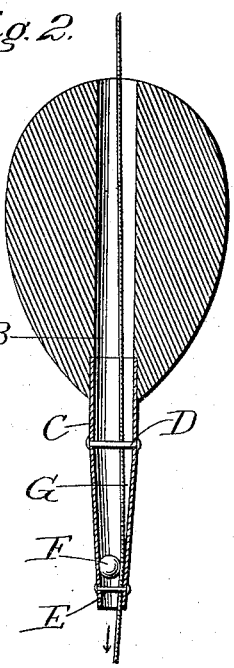
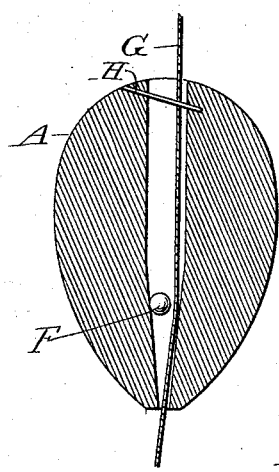
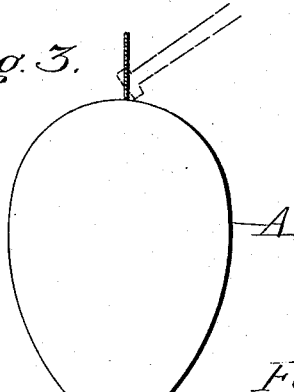
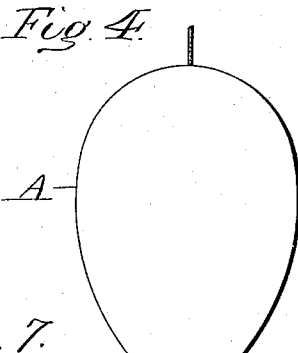
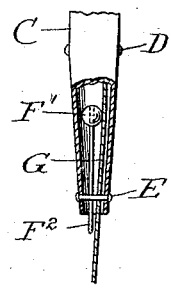
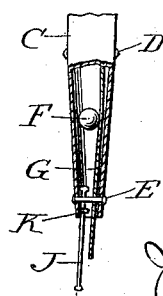
Witnesses
D. Burdine
Fannie Wise
Inventor
James F. Marsters,
by Dodge and Sons
Attorneys
THE NORRIS PETERS CO., PHOTO-LITHO., WASHINGTON, D. C.

UNITED STATES PATENT OFFICE.

JAMES F. MARSTERS, OF BROOKLYN, NEW YORK.

FISHING-FLOAT.

SPECIFICATION forming part of Letters Patent No. 717,237, dated December 30, 1902.

Application filed August 25, 1902. Serial No. 120,966. (No model.)

*To all whom it may concern:*

Be it known that I, JAMES F. MARSTERS, a citizen of the United States, residing at Brooklyn, in the county of Kings and State of New York, have invented certain new and useful Improvements in Fishing-Floats, of which the following is a specification.

My present invention pertains to improvements in fishing-floats, the construction and advantages of which will be hereinafter set forth, reference being had to the annexed drawings, wherein—

Figure 1 is a perspective view of the float; Fig. 2, a vertical sectional view of the same; Fig. 3, a perspective view, partly in section, the parts being shown in a different relation from that indicated in Fig. 2; Fig. 4, a similar view illustrative of a modified form; Fig. 5, a vertical sectional view showing a still further modification, and Figs. 6 and 7 sectional views showing releasing devices for the clamping member.

In the use of floats in fishing it sometimes occurs when any considerable length of line is used between the float and the sinker or hook that the float comes into contact with the tip of the rod, preventing further reeling in of the line, and as a consequence preventing the proper handling and landing of the fish.

The principal object of the present invention is to overcome this difficulty and to provide a simple and efficient means for clamping the float to the line, which clamping means will be released as soon as the float touches the tip of the rod, permitting the float to drop down on the line to the sinker or snell, according as the line is rigged.

A further object of the invention is to provide means for releasing the clamping member or ball in case the float should drop down to the sinker, in which position further movement would be impossible without removing the sinker, and as a consequence the float could not be released.

I am aware that heretofore floats have been constructed to accomplish this end. No claim is herein made, broadly, to such subject-matter, the present application being designed to cover, both generically and specifically, the general type of clamping device shown and now to be described.

A designates the body of the float, made of any material which will give sufficient buoyancy and likewise made of any desired form, that shown being the one most commonly used. An opening or channel B extends longitudinally through the body, and in the lower end of the opening is secured a tubular member C, the lower portion of which tapers toward its outer end. This member forms a continuation of the opening or channel B.

In the form illustrated in Figs. 1 to 3, both inclusive, two pins D and E extend across the tubular portion, pin D being located approximately at the upper end of the tapering portion, while pin E is arranged at the lower end. Before one or the other of said pins is finally secured in position a ball F is placed within the tapering tube, the ball being of a diameter equal to or approximating the diameter of the smaller end of the tube. With the parts in the positions shown in Fig. 2 the ball will clamp or bind the line G against the tube and the greater the stress on the line downward or in the direction of the arrow the greater the binding effect.

The bite of the clamp on the line is sufficient to hold the float in its adjusted position when in use; but should occasion arise when it becomes necessary to reel in so much line as would cause the float to come into contact with the tip of the rod, then a slight upward pull on the line, with the float held in contact with the tip, would cause the line to roll the ball upward, as in Fig. 3, releasing the float from the line and permitting the float to drop.

In Fig. 4 a slightly-modified form is illustrated, wherein instead of employing the pins or cross-bars the tube is indented both at its upper and lower ends at diametrically opposite points, forming projections I, which serve to confine the ball within the tube.

In Fig. 5 a still further modification is illustrated, wherein instead of employing a tubular member secured to the body the opening in the body through which the line passes is formed with a tapering section, in which the ball-clamp works, as shown. The lower end of the opening is made of such size as to prevent the ball from passing out therethrough, while a pin H or the like extends across the opening at the upper end of the float and prevents the ball from passing out of that end.

The action is the same with either form. It is apparent that the lower end of the tube could be made so small as to preclude the outward passage of the ball, in which event the lower bar or projections could be dispensed with. So, too, the upper end of the tube could be turned inwardly to effect the same object as the upper cross-bar or projections. Again, the float might be formed with an inwardly-projecting shoulder above the tube, these being evident modifications of the construction above described.

The line is readily passed through the float and as readily secured in position at any point thereon. By inverting the float from its normal position the ball occupies a position in the large part of the tube, and the line may be drawn therethrough without the slightest clamping action. With the float in its normal position the ball tends to gravitate to the narrow part of the tube, and a slight downward pull on the line will cause a clamping of the parts.

In Fig. 6 the ball or clamping member F' is shown as provided with a pin F², by which the ball may be bodily raised in order to release the line from the clamping action thereof. In Fig. 7 a still further modification is shown, in which a pin J passes through a loop K, secured to the inner wall of the tubular member C. By forcing the pin upwardly into the tube the ball may be released from its clamping position. These forms, while not absolutely essential, may be used in conjunction with the ball as a clamping device in order to release the same should the float pass entirely down to the sinker and come in contact therewith, so as to prevent any further movement of the float upon the line, which is necessary in order to release the ball.

Having thus described my invention, what I claim is—

1. In combination with the body of a float; a tapering tube extending therefrom; a ball loosely mounted in said tube; and means for confining said ball therein.

2. In combination with the body of a float; a tapering tube extending downwardly therefrom, the smaller end of the tube being lowermost; and a ball loosely mounted in said tube and serving to clamp or bind a line which may be passed through said tube.

3. In combination with the body of a float; a tapering tube extending downwardly therefrom, the smaller end of the tube being lowermost; a ball loosely mounted in said tube; and means for retaining the ball in place.

4. In combination with the body of a float; a tapering tube extending downwardly therefrom, the smaller end of the tube being lowermost; a ball loosely mounted in the tube; and means carried by the tube for confining the ball therein.

5. In combination with the body of a float; a tapering tube extending downwardly therefrom, the smaller end of the tube being lowermost; a ball loosely mounted in the tube, the diameter of the ball approximating the interior diameter of the smaller end of the tube; and means projecting inwardly from the walls of the tube and serving to confine the ball therein.

6. In combination with the body of a float; a tapering tube extending downwardly therefrom in line with an opening formed therein, the smaller end of the tube being lowermost; a ball loosely mounted in the tube, the diameter of the ball approximating the interior diameter of the smaller end of the tube; and pins D, E extending across said tube, substantially as described.

7. A float provided with a tapering opening or channel; a ball loosely mounted therein; and means for confining the ball within the opening.

8. A float provided with a tapering opening or channel; a ball mounted therein; means for confining the ball within the opening; and means for positively forcing the ball into the larger portion of the opening or channel, substantially as and for the purpose described.

9. A float provided with a tapering opening or channel; a ball mounted therein; means for confining the ball within the opening; and a pin secured to the ball.

In testimony whereof I have signed my name to this specification in the presence of two subscribing witnesses.

JAMES F. MARSTERS.

Witnesses:
 GEO. W. PEARSALL,
 MICHAEL J. RYAN.